United States Patent [19]

Frisch

[11] Patent Number: 4,740,680

[45] Date of Patent: Apr. 26, 1988

[54] STAR SENSOR ARRANGEMENT FOR A ROTATING SATELLITE HAVING TWO FIELDS OF VIEW

[75] Inventor: Eberhard Frisch, Unterhaching, Fed. Rep. of Germany

[73] Assignee: Messerschmitt-Bölkow-Blohm GmbH, Munich, Fed. Rep. of Germany

[21] Appl. No.: 922,273

[22] Filed: Oct. 23, 1986

[30] Foreign Application Priority Data

Oct. 24, 1985 [DE] Fed. Rep. of Germany ....... 3537871

[51] Int. Cl.$^4$ ............................ G05B 1/00; F41G 7/00
[52] U.S. Cl. ................................. 250/203 R; 244/3.18
[58] Field of Search ........................ 250/203 R, 203 S; 126/425; 244/3.16–3.18

[56] References Cited

U.S. PATENT DOCUMENTS

| | | | |
|---|---|---|---|
| 2,923,202 | 2/1960 | Trimble | 244/3.18 |
| 3,180,587 | 4/1965 | Garner et al. | 244/1 |
| 4,159,419 | 6/1979 | Wittke | 250/203 R |
| 4,309,005 | 1/1982 | McLean | 244/3.16 |
| 4,675,715 | 6/1987 | Frisch | 250/203 R |

Primary Examiner—David C. Nelms
Assistant Examiner—Stephone B. Allen
Attorney, Agent, or Firm—Kenyon & Kenyon

[57] ABSTRACT

A star sensor arrangement for a satellite which on its orbit and/or during transfer into the orbit rotates at least with a part about an axis of rotation fixed with respect to the satellite, and which is equipped with a star sensor looking in the direction of the axis of rotation and likewise rotating about the axis of rotation, having a co-rotating mirror arranged in the viewing direction of the star sensor which is set obliquely with respect to said direction.

2 Claims, 1 Drawing Sheet

STAR SENSOR ARRANGEMENT FOR A ROTATING SATELLITE HAVING TWO FIELDS OF VIEW

BACKGROUND OF THE INVENTION

The present invention relates to a star sensor arrangement for a satellite which on its orbit and/or during the transfer into the orbit rotates at least with a part about an axis of rotation fixed with respect to the satellite, and which is equipped with a star sensor looking in the direction of the axis of rotation and likewise rotating about the axis of rotation.

Such a star sensor arrangement is known from German patent application No. P 34 28 741.8 (U.S. Pat. No. 4,674,715). What is involved there is an earth satellite which comprises a satellite body oriented toward the sun as well as a functional part rotatably connected therewith. The functional part carries functional elements oriented toward the earth, for example, antennas or cameras. During one orbital revolution about an axis of rotation oriented perpendicularly to the orbital plane and fixed with respect to the satellite, it executes almost a complete rotation in the orbital direction. Applied on the functional part is a star sensor viewing in the direction of this axis of rotation, as is also an additional star sensor, but which has a viewing direction which differs from the axis of rotation and which due to the rotation of the functional part revolves quasi on a conical generated surface with the axis of rotation as the axis of symmetry.

By means of the two star sensors provided on the rotating functional part this known measuring arrangement can provide a very accurate position determination of the functional part itself, the exact orientation of which is of primary importance.

However, it appears as a disadvantage that two star sensors must be used. These components are relatively expensive, and it is therefore desirable to reduce their number as far as possible.

Also spin-stabilized satellites, which as a whole rotate relatively fast about an axis of rotation generally fixed in space, may be equipped with one or more star sensors, at least one of which is oriented with its viewing direction in the direction of the axis of rotation. If only one such star sensor is provided, difficulties may arise with such a satellite, for example, in the transfer phase before the desired orbit is reached, due to the fact that the one star sensor, which generally looks in the thrust direction, temporarily does not have a bright star in its field of vision. Thereby even a rough position control during the transfer phase is rendered difficult at best.

SUMMARY OF THE INVENTION

It is an object of the present invention to provide a star sensor arrangement of the initially mentioned kind which manages with a minimum of star sensors and ensures a position control as accurate as possible during the transfer and/or after reaching orbit.

The above and other objects of the invention are achieved by a star sensor arrangement for a satellite which on its orbit and/or during transfer into the orbit rotates at least with a part about an axis of rotation fixed with respect to the satellite, and which is equipped with a star sensor having a viewing direction in the direction of the axis of rotation and likewise rotating about the axis of rotation, further comprising a co-rotating mirror arranged in the viewing direction of the star sensor which is set obliquely with respect to the viewing direction.

Thus, according to the invention, there is arranged in the viewing direction of the star sensor a co-rotating mirror set obliquely relative to this direction. Thus, a single star sensor is sufficient, namely, the one oriented in the direction of the axis of rotation. The viewing direction thereof is deflected by the likewise rotating mirror preferably at an acute angle from the axis of rotation and thus revolves on a conical generate surface. This causes in periodical repetition ever new, sufficiently bright stars to come into the field of vision of the star sensor, whereby a basis is given for exact position control. If the desired orientation of the satellite is maintained and if its speed of rotation is known, it can be calculated in advance when a certain star appears in the field of vision of the star sensor and what orbit its image point should describe in the star sensor image plane. In the image plane of the star sensor is appropriately a matrix-like arrangement of high-resolution photo sensor elements, for example, CCD arrays. From deviations of the image point from the precalculated orbit in the image plane, a misorientation of the satellite can be inferred mathematically. The position error signals to be determined therefrom are then transformed by the position control of the satellite into corresponding correction commands.

According to an advantageous development of the invention, it is provided to use a semi-transparent mirror. Thus there result, practically simultaneously, two viewing directions of the star sensor, namely, one oriented in the direction of the axis of rotation, and a second one revolving on a conical path. The superimposed images resulting therefrom can easily be separated from each other during the evaluation, as they are differently modulated on the basis of the rotary motion of the satellite or respectively of its rotating part carrying the star sensor. In this case it is possible to evaluate predominantly the ray path oriented in the direction of the axis of rotation as long as a sufficiently bright star is in the field of vision thereof. If that is not the case, resort can be made to the ray path deflected by the rotating mirror.

The principle of deflecting the viewing direction of the star sensor with the aid of an obliquely set rotating mirror from the direction of the axis of rotation can be employed also for a communications satellite whose pivoting antenna reflector is tilted down during the transfer phase over the star sensor, whereby the viewing direction thereof would actually be completely covered up. In this case the tilted-down antenna reflector is given precisely over the star sensor an opening which clears the field of view of the star sensor, as well as a mirror which is secured to it above the opening and extends obliquely into the viewing direction of the star sensor. The mirror then goes into operation only during the transfer phase, during which the satellite or at least the functional part carrying the antenna rotates about an axis of rotation oriented in the thrust direction, with which the viewing direction of the star sensor coincides. After the orbit has been reached, the antenna reflector with the mirror attached to it is flapped up, so that the star sensor now looks only in the axial direction. Any inaccuracies caused by the attachment of the mirror on the pivoting antenna reflector have no adverse effect, as extreme accuracy of position measurement is not necessary during the transfer phase.

The invention, therefore, is applicable both to spin stabilized satellites and to those of the dual spin type which comprise a non-rotating satellite body and a rotating functional part, where the non-rotating satellite body may be stabilized with respect to three axes. The rotating, obliquely set mirror may then be employed in the ray path of the star sensor either only during the transfer phase or only after orbit has been reached, and also in a single mission during both phases.

BRIEF DESCRIPTION OF THE DRAWINGS

In the following, two embodiments of the invention will be explained more specifically with reference to the figures, in which.

DETAILED DESCRIPTION

Figure 1:
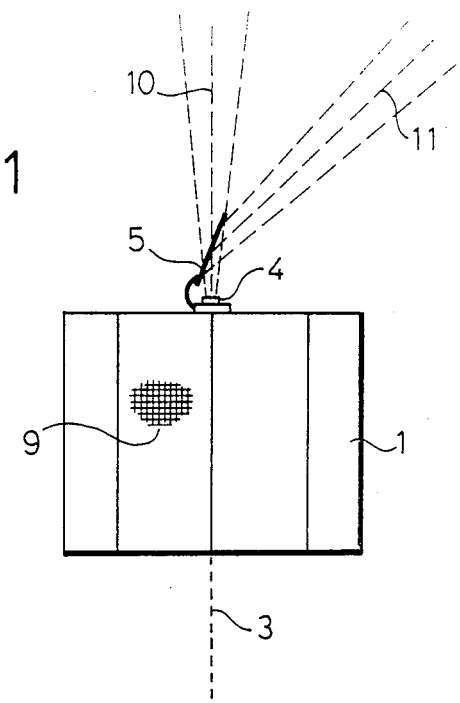
FIG. 1 shows a spin-stabilized satellite with the star sensor arrangement according to the invention.

With reference now to the drawings, FIG. 1 illustrates in a schematic, highly simplified manner a spin-stabilized satellite 1 rotating about an axis of rotation 3. The satellite is octagonal in cross-section and carries at its eight outer faces solar cells 9 for the purpose of energy supply. A star sensor 4 is disposed on the satellite 1 in such a way that its viewing direction 10 is at first oriented in the direction of the axis of rotation 3. In this ray path of the star sensor 4, an obliquely set semi-transparent mirror 5 firmly connected with the satellite 1 is arranged. Consequently there results, in addition, a new viewing direction 11 of the star sensor 4, which due to the rotation of satellite 1 revolves about its axis of rotation 3 on a conical generated surface. During such a revolution, a large number of stars of different brightness gets into the field of vision of the star sensor 4 lying in the viewing direction 11. The star sensor consists essentially of a lens system and an extended matrix type arrangement of photosensor elements located in the image-side focal surface of the lens system, for which purpose CCD arrays are appropriately used.

The reading out of such photosensor arrays is in principle state of the art and does not form part of the invention. In the case of the semitransparent mirror 5 of FIG. 1, two superimposed images are formed in the image plane of the star sensor 4. The image to be associated with the viewing direction 10 contains concentric circular tracks of the stars present in the associated field of vision. The image associated with the viewing direction 11, however, contains parallel, only slightly curved star tracks forming almost straight lines. This difference in image structure can be utilized for the purpose of separating the two images in their evaluation.

Figure 2:
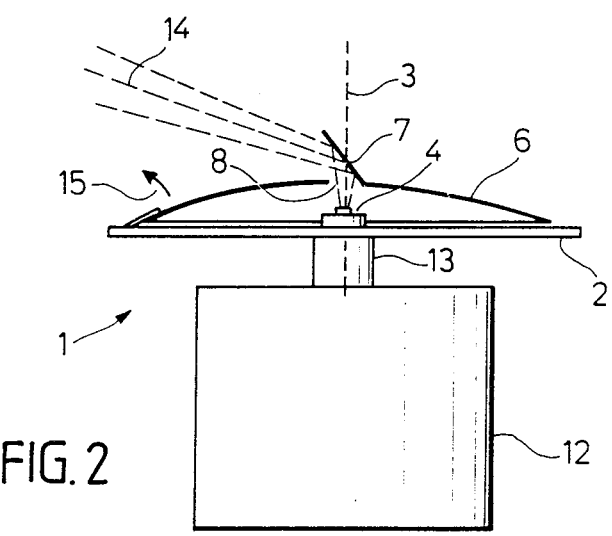
FIG. 2 shows a satellite with non-rotating satellite body and rotating functional part carrying a pivoting antenna reflector and a star sensor arrangement according to the invention.

In FIG. 2 is shown in schematic, highly simplified manner a satellite 1 of the dual spin type, which consists of a nonrotating satellite body 12 and a functional part 2 attached thereon through a rotating coupling 13. On the functional part 2, designed as a carrier platform, a pivoting antenna reflector 6 is disposed, which in FIG. 2 is shown in the tilted-down position, in which it would actually cover up the field of view of the star sensor 4 likewise provided on the functional part. The antenna reflector 6, however, has in its region located above the star sensor 4 in the tilted-down state an opening 8, which clears the field of view for the star sensor 4. Above this opening 8, at the antenna reflector 6, an obliquely set mirror 7 is applied, which leads to a viewing direction 14 changed as compared with the original viewing direction of the star sensor 4, which coincides with the axis of rotation 3 of the functional part 2. Here too, due to the rotation of the functional part 2 about its axis of rotation 3, this viewing direction 14 revolves on a conical generated surface. The star sensor 4 may be constructed like that in FIG. 1. The antenna reflector 6 is in the tilted-down position shown in FIG. 2 only during the transfer phase of the satellite mission. When orbit has been reached, the antenna reflector 6 pivots up in the direction of arrow 15, and hence the mirror 7 disappears from the ray path of the star sensor 4, the viewing direction of which now coincides with the axis of rotation 3 of the rotating functional part 2. In the case of satellite 1 of FIG. 2, the position control can be monitored during the transfer phase roughly by the star sensor 4 alone. After the orbit has been reached, for example, a geostationary orbit with viewing direction of star sensor 4 oriented to North, generally the addition of other sensors, as for instance earth or solar sensors, is necessary for position control. The exciter belonging to the antenna reflector 6 as well as other parts of the satellite not essential to the invention are not shown in FIG. 2. The latter is true also of FIG. 1.

The angle under which the mirrors 5 and 7 are inclined relative to the viewing direction 10 in FIG. 1, or respectively to the axis of rotation 3 in FIG. 2, depends on the specific facts of the satellite mission. This angle will be taken so that during one revolution a maximum number of especially bright and well identifiable stars get into the rotating field of vision of the star sensor 4. It should be noted in this connection that having the sun with its extremely high radiation intensity fall into the field of vision of the star sensor 4 should be avoided to the extent possible, as this could be harmful to the photo sensors.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A star sensor arrangement for a satellite which is adapted to rotate at least with a part about an axis of rotation fixed with respect to the satellite, and which is equipped with a star sensor having a first viewing direction in the direction of the axis of rotation and likewise rotating about the axis of rotation, further comprising a co-rotating semi-transparent mirror arranged in the first viewing direction of the star sensor which is set obliquely with respect to said first viewing direction thereby to provide a second viewing direction, said second viewing direction determined by the angle of said mirror and revolving about the axis of rotation of the satelite on a conical generated surface swept by the second viewing direction during rotation, said star sensor arrangement differentiating between radiant objects viewed along said first and second viewing directions by the appearance of the star tracks formed in the respective viewing directions, the star tracks formed in the first viewing direction being concentric circular tracks and the star tracks formed in the second viewing direction being substantially parallel, slightly curved lines.

2. The arrangement recited in claim 1, wherein said mirror is mounted on a pivoting antenna reflector disposed above the star sensor when said reflector is in a down-tilted state above an opening in the antenna reflector which in said down-tilted state clears the viewing direction of the star sensor.

* * * * *